United States Patent
Liu et al.

(10) Patent No.: US 10,530,561 B1
(45) Date of Patent: Jan. 7, 2020

(54) ADAPTIVE METHOD TO REDUCE TRAINING TIME OF RECEIVERS

(71) Applicant: Xilinx, Inc., San Jose, CA (US)

(72) Inventors: Zao Liu, Santa Clara, CA (US); Yang Liu, San Jose, CA (US); Zhaoyin D. Wu, San Jose, CA (US); Geoffrey Zhang, San Jose, CA (US); Yu Xu, Palo Alto, CA (US); Alan C. Wong, San Jose, CA (US)

( * ) Notice: Subject to any disclaimer, the term of this patent is extended or adjusted under 35 U.S.C. 154(b) by 0 days.

(21) Appl. No.: 16/359,921

(22) Filed: Mar. 20, 2019

(51) Int. Cl.
 *H04L 7/00* (2006.01)
 *H04L 25/02* (2006.01)
 *H04L 25/03* (2006.01)

(52) U.S. Cl.
 CPC ........ *H04L 7/0008* (2013.01); *H04L 25/0226* (2013.01); *H04L 25/03006* (2013.01); *H04L 2025/0377* (2013.01); *H04L 2025/03815* (2013.01)

(58) Field of Classification Search
 CPC .............................. G05B 13/00; G05B 13/0265
 See application file for complete search history.

(56) References Cited

U.S. PATENT DOCUMENTS

| 6,757,665 | B1 * | 6/2004 | Unsworth | F04D 15/0077 |
| | | | | 706/15 |
| 6,779,043 | B1 * | 8/2004 | Crinion | H04L 45/08 |
| | | | | 370/255 |
| 7,227,891 | B2 | 6/2007 | Wang | |
| 8,838,056 | B2 | 9/2014 | Fanaswalla et al. | |
| 9,178,552 | B1 | 11/2015 | Satarzadeh et al. | |
| 9,654,327 | B2 | 5/2017 | Liao et al. | |
| 9,753,887 | B2 | 9/2017 | Priborsky et al. | |
| 2018/0191488 | A1 * | 7/2018 | Matsudaira | H04L 12/40013 |
| 2018/0330238 | A1 * | 11/2018 | Luciw | G06N 3/08 |

OTHER PUBLICATIONS

Kingma, Diederik P., Adam: a method for stochastic optimization, published as a conference paper at ICLR 2015, Jan. 30, 2017, 15 pages, San Diego, CA USA.

* cited by examiner

*Primary Examiner* — Kevin Kim
(74) *Attorney, Agent, or Firm* — Craige Thompson; Thompson Patent Law

(57) ABSTRACT

Apparatus and associated methods relate to using a high learning rate to speed up the training of a receiver and switching from a high learning rate to a low learning rate for fine tuning based on exponentially weighted moving average convergence. In an illustrative example, a selection circuit may switch the high learning rate to the low learning rate based on a comparison of a moving average difference $e_n$ to a predetermined stability criteria $T_1$ of the receiver. The moving average difference $e_n$ may include an exponentially weighted moving average of a difference between two consecutive exponentially weighted moving averages of an operation parameter $u_n$ of the signal communication channel. By using this method, the training time for the receiver may be advantageously reduced.

20 Claims, 13 Drawing Sheets

ADAPTIVE METHOD TO REDUCE TRAINING TIME OF RECEIVERS

TECHNICAL FIELD

Various embodiments relate generally to reduced receiver training time.

BACKGROUND

Data represents information that has useful value. Data can take the form of stored information. Data storage can be in analog form. Data storage can also be in digital form.

Data can also be in digital format communicated between two nodes. When data is communicated, for example, it can be received and interpreted as a function of time. Some systems that receive communicated digitally-formatted data are based on a clock that determines when a voltage signal is sampled to decide whether a symbol in a data stream is, for example, a one or a zero.

SUMMARY

Apparatus and associated methods relate to using a high learning rate to speed up the training of a receiver and switching from a high learning rate to a low learning rate for fine tuning based on exponentially weighted moving average convergence. In an illustrative example, a selection circuit may switch the high learning rate to the low learning rate based on a comparison of a moving average difference $e_n$ to a predetermined stability criteria $T_1$ of the receiver. The moving average difference $e_n$ may include an exponentially weighted moving average of a difference between two consecutive exponentially weighted moving averages of an operation parameter $u_n$ of the signal communication channel. By using this method, the training time to equalize the receiver channel may be advantageously reduced.

Various embodiments may achieve one or more advantages. Some embodiments may be flexibly employed, for example, in a programmable logic, such as a field programmable gate array (FPGA) that may permit the training of the receiver to be adjusted. In some embodiments, cost, size or power may be reduced, for example, by implementing on a fixed hardware platform, such as an application-specific integrated circuit (ASIC). Some implementations may involve execution of preprogrammed instructions and/or software executed by a processor to achieve reduced training time by changing the training from a high learning rate to a low learning rate. Some embodiments may be based on an overall adaptation trend without sampling every adaptation code for each adaptation cycle since only the overall trend of the code changes is considered. Therefore, a down sampling clock that is several times slower than the clock that controls the adaptation clock may be used to make the design cost-effective. For example, some embodiments may detect the convergence of channel equalization parameters, such as automatic gain control (AGC) adaptation code, decision feedback equalization (DFE) tap coefficient, or unroll threshold (UT) code, robustly, adaptively, and flexibly.

In one exemplary aspect, a control circuit includes a learning mode circuit configured to generate a first learning mode signal $LM_1$ with a first adaptation rate and a second learning mode signal $LM_2$ with a second adaptation rate. The first adaptation rate is larger than the second adaptation rate. A selection circuit is configured to receive the $LM_1$ and $LM_2$ and output a selected learning mode signal based on a comparison of a moving average difference $e_n$ to a predetermined stability criteria $T_1$ of a signal communication channel. The moving average difference $e_n$ includes an exponentially weighted moving average of a difference between two consecutive exponentially weighted moving average of an operation parameter $u_n$ of the signal communication channel.

In some embodiments, the selection circuit may be further configured to switch from the first adaption rate to the second adaption rate in response to determining that the moving average difference $e_n$ satisfies the predetermined stability criteria $T_1$. In some embodiments, the signal communication channel may include a serializer/deserlizer (SERDES) receiver. In some embodiments, the signal communication channel may include a clock data recovery lock detection circuit. In some embodiments, the operation parameter $u_n$ may include an automatic gain control (AGC) adaptation code. In some embodiments, the first learning mode signal may be configured to adapt the operation parameter $u_n$ according to a first clock rate and sample the operation parameter according to a second clock rate that is less than the first clock rate.

In some embodiments, the control circuit may also include an error detection circuit configured to detect the moving average difference $e_n$. The error detection circuit may include a first exponentially weighted moving average ($EWMA_1$) circuit configured to receive the operation parameter $u_n$ and calculate a first exponentially weighted moving average $x_n$, $x_n=(1-\alpha_1)x_{n-1}+\alpha_1 u_n$. The error detection circuit may include a calculation circuit configured to receive two consecutive first exponentially weighted moving average $x_n$ and $x_{n-1}$ and output an intermediate value $v_n$, $v_n=|x_n-x_{n-1}|$. The error detection circuit may also include a second exponentially weighted moving average ($EWMA_2$) circuit configured to receive the intermediate value $v_n$ and output the moving average difference $e_n$, $e_n=(1-\alpha_2)e_{n-1}+\alpha_2 v_n$, $\alpha_1$ is a first decay rate and $\alpha_2$ is a second decay rate.

In some embodiments, the $EWMA_1$ circuit may include a first amplifier, having a first amplification coefficient $\alpha_1$, configured to receive the operation parameter $u_n$. A first register may be configured to store a former exponentially weighted moving average $x_{n-1}$. A second amplifier, having a first amplification coefficient $\alpha_1$, may be configured to receive the former exponentially weighted moving average $x_{n-1}$ and generate a first amplified former exponentially weighted moving average $\alpha_1 x_{n-1}$. A first subtraction circuit may be configured to receive the $x_{n-1}$ and the $\alpha_1 x_{n-1}$ and generate a first temporary value $(1-\alpha_1)x_{n-1}$. A first summing circuit may be configured to the first amplifier and the first subtraction circuit to generate the first exponentially weighted moving average $x_n$.

In some embodiments, the $EWMA_2$ circuit may include a third amplifier, having a second amplification coefficient $\alpha_2$, configured to receive the intermediate value $v_n$. A second register may be configured to store a former moving average difference $e_{n-1}$. A fourth amplifier, having a second amplification coefficient $\alpha_2$, may be configured to receive the former moving average difference $e_{n-1}$ and generate a first amplified former moving average difference $\alpha_2 e_{n-1}$. A second subtraction circuit may be configured to receive the $e_{n-1}$ and the $\alpha_2 e_{n-1}$ and generate a second temporary value $(1-\alpha_2)e_{n-1}$. A second summing circuit may be configured to connect with the third amplifier and the second subtraction circuit to generate the moving average difference $e_n$.

In another exemplary aspect, a method to control the training of a signal communication channel, includes generating a first learning mode signal $LM_1$ with a first adaptation rate and generating a second learning mode signal $LM_2$ with a second adaptation rate by a learning mode circuit, the first adaptation rate is larger than the second adaptation rate. The method also includes selecting, by a selection circuit, a learning mode signal from the $LM_1$ and the $LM_2$ based on a comparison of a moving average difference $e_n$ to a predetermined stability criteria $T_1$ of a signal communication channel. The method also includes applying the selected learning mode signal on the signal communication channel. The moving average difference $e_n$ includes an exponentially weighted moving average of a difference between two consecutive exponentially weighted moving average of an operation parameter $u_n$ of the signal communication channel.

In some embodiments, the selection circuit may be further configured to switch from the first adaption rate to the second adaption rate in response to determining that the moving average difference $e_n$ satisfies the predetermined stability criteria $T_1$. In some embodiments, when the moving average difference $e_n$ is larger than the predetermined stability criteria $T_1$, the selection circuit may select the first learning mode signal $LM_1$. When the moving average difference $e_n$ meets the predetermined stability criteria $T_1$, the selection circuit may select the second learning mode signal $LM_2$. In some embodiments, the signal communication channel may include a SERDES receiver. In some embodiments, the signal communication channel may include a clock data recovery lock detection circuit. The operation parameter may include an automatic gain control (AGC) adaptation code. In some embodiments, the first learning mode signal may be configured to adapt the operation parameter $u_n$ according to a first clock rate and sample the operation parameter $u_n$ according to a second clock rate that is less than the first clock rate.

In some embodiments the moving average difference $e_n$ may be detected by an error detection circuit, the error detection circuit may include a first exponentially weighted moving average ($EWMA_1$) circuit configured to receive the operation parameter $u_n$ and calculate a first exponentially weighted moving average $x_n$, $x_n=(1-\alpha_1)x_{n-1}+\alpha_1 u_n$. The error detection circuit may also include a calculation circuit configured to receive two consecutive first exponentially weighted moving average $x_n$ and $x_{n-1}$ and output an intermediate value $v_n$, $v_n=|x_n-x_{n-1}|$. The error detection circuit may also include a second exponentially weighted moving average ($EWMA_2$) circuit configured to receive the intermediate value $v_n$ and output the moving average difference $e_n$, $e_n=(1-\alpha_2)e_{n-1}+\alpha_2 v_n$, $\alpha_1$ is a first decay rate and $\alpha_2$ is a second decay rate.

In some embodiments, the $EWMA_1$ circuit may include a first amplifier. The first amplifier, having a first amplification coefficient $\alpha_1$, may receive the operation parameter $u_n$. A first register may store a former exponentially weighted moving average $x_{n-1}$. A second amplifier, having a first amplification coefficient $\alpha_1$, may receive the former exponentially weighted moving average $x_{n-1}$ and generate a first amplified former exponentially weighted moving average $\alpha_1 x_{n-1}$. A first subtraction circuit may receive the $x_{n-1}$ and the $\alpha_1 x_{n-1}$ and generate a first temporary value $(1-\alpha 1)x_{n-1}$. A first summing circuit may be configured to the first amplifier and the first subtraction circuit to generate the first exponentially weighted moving average $x_n$.

In some embodiments, the $EWMA_2$ circuit may include a third amplifier. The third amplifier, having a second amplification coefficient $\alpha_2$, may receive the intermediate value $v_n$. A second register may store a former moving average difference $e_{n-1}$. A fourth amplifier, having a second amplification coefficient $\alpha_2$, may be configured to receive the former moving average difference $e_{n-1}$ and generate a first amplified former moving average difference $\alpha_2 e_{n-1}$. A second subtraction circuit may be configured to receive the $e_{n-1}$ and the $\alpha_2 e_{n-1}$ and generate a second temporary value $(1-\alpha_2)e_{n-1}$. A second summing circuit may be configured to connect with the third amplifier and the second subtraction circuit to generate the moving average difference $e_n$.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
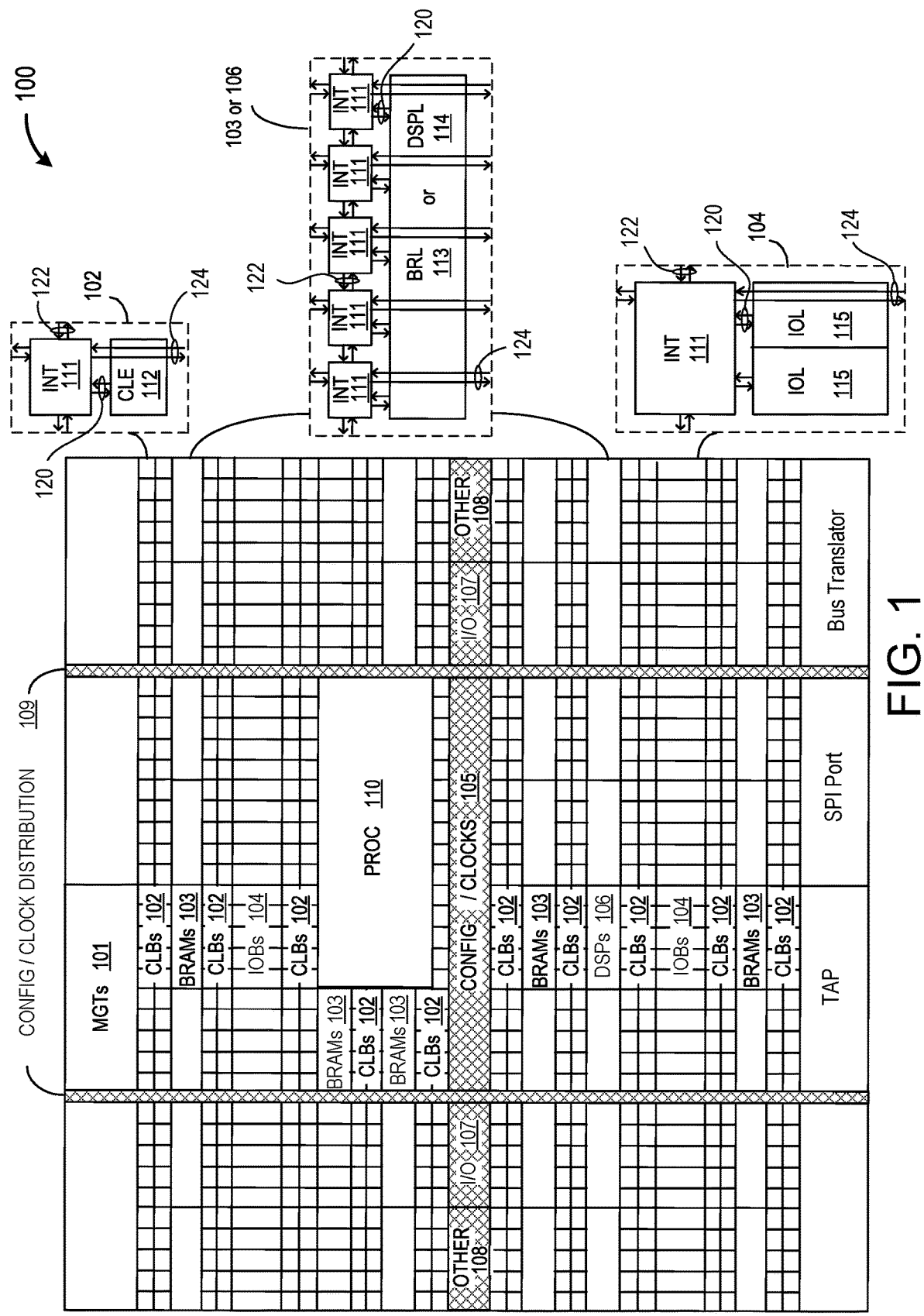
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes field programmable gate array (FPGA) logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. The programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An IOB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

An FPGA may be programmed to work for data transfer operations. At least one transceiver may be embedded in the FPGA to perform data transmitting and data receiving during communication sessions. To achieve a good link bit error rate (BER) margin, some receivers may need to be trained before entering into a normal operation mode. High speed data communication may require the receivers to have a short training time. For example, peripheral component interconnect express (PCIe) may specify a maximum permissible training time.

Figure 2:
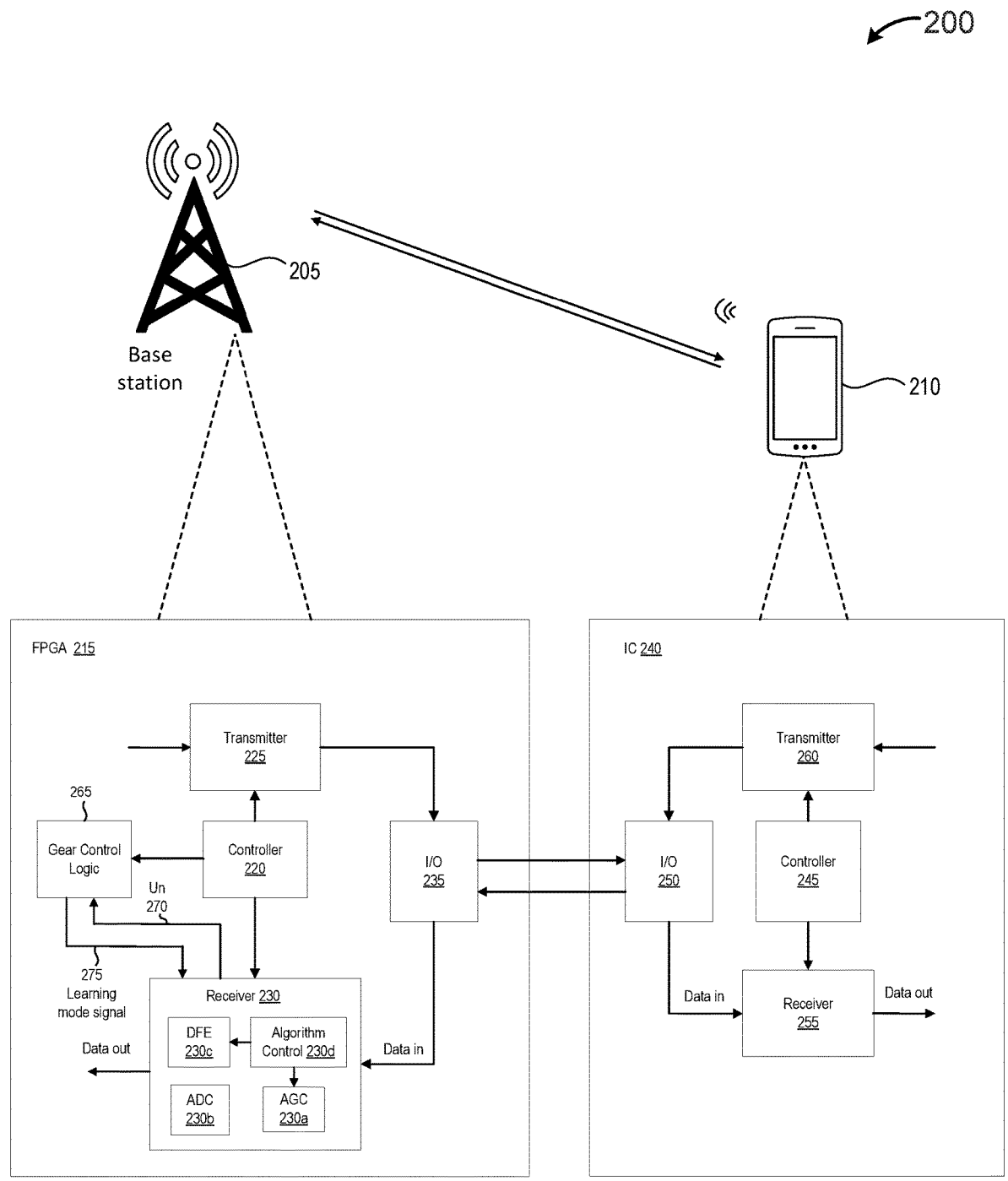
FIG. 2 depicts an exemplary field programmable gate array (FPGA) implemented in a communication system.

FIG. 2 depicts an exemplary field programmable gate array (FPGA) implemented in a communication system. A communication system 200 includes a base station 205 transmitting and receiving data from a cell phone 210. In this exemplary example, the base station 205 includes a first field programmable gate array (FPGA) 215 to perform data communication from the base station 205 to the cell phone 210. The FPGA 215 includes a first controller 220 configured to control the operation of a first transmitter 225 and a first receiver 230. The first transmitter 225 transmits data signals and the first receiver 230 receives data signals through a first I/O interface 235. In this depicted example, the receiver 230 includes an automatic gain control (AGC) circuit 230a configured to ensure received analog signal amplitudes are neither too low nor too high for input to an analog-to-digital converter (ADC) 230b to ensure an acceptable quantization error during operation of the ADC 230b. The receiver 230 also includes a decision feedback equalization (DFE) 230c. The DFE 230c may further equalize samples for signal processing. The receiver 230 also includes an algorithm control circuit 230d. The algorithm control circuit 230d may include truth tables to decide the amount of equalization needed. The algorithm control circuit 230d may also be configured to generate an AGC feedback signal as a control feedback input to the AGC circuit 230a or generate a DFE feedback signal as a control feedback input to the DFE 230c. The AGC feedback signal may be used for analog adjustments by the AGC circuit 230a.

The cell phone 210 includes an integrated circuit (IC) 240 to perform data communication between the base station 205 and the cell phone 210. The IC 240 includes a second controller 245 configured to control the operation of a second receiver 255 and a second transmitter 260. The second receiver 255 receives data signals from the base station 205 and the second transmitter 260 transmits data signals through a second I/O interface 250 to the base station 205.

Receivers (e.g., the first receiver 230, the second receiver 255) normally work in an operation mode and need to be trained before entering into the operation mode. In various embodiments, the training may run gradient descent for each operation parameter of the receiver. To speed up the training, the receiver (e.g., the first receiver 230, the second receiver 255) may be trained at a high learning rate first. Once the receiver is trained, the high learning rate may be switched to the low learning rate so that the performance of the receiver may be optimized. In some embodiments, the first receiver 230 and/or the second receiver 255 may be a SERDES receiver.

In this depicted example, the FPGA 215 also includes a gear control logic 265. The gear control logic 265 monitors the training status of the receiver 230 and selects a corresponding learning mode for the training. More specifically, the gear control logic 265 receives one or more channel equalization parameters $U_n$ (e.g., the AGC adaptation code, the DFE tap coefficient) 270 from the receiver 230 and generates a learning mode signal 275 to apply to the algorithm control circuit 230d of the receiver 230. The gear control logic 265 may be programmed to find the right time to switch the training from a high learning rate to a low learning rate. In some embodiments, the learning mode may include a high learning mode with a high learning rate, a medium learning mode with a medium learning rate, and a low learning mode with a low learning rate. In some embodiments, the learning rate difference between the high learning rate and the low learning rate may be preset by a user. For example, a ratio of the high learning rate to the low learning rate may, in some embodiments, range between about 2× and at least about 512×. The first controller 220 may enable or disable the gear control logic 265 in response to a user command signal. An example of a gear control logic is described in further detail with reference to FIG. 3A.

In this depicted example, the gear control logic 265 is arranged on the same programmable logic (e.g., FPGA 215) with the receiver 230. In another embodiment, the gear control logic 265 may be implemented in a different programmable logic (e.g., another FPGA) to control the training of the receiver 230.

In some embodiments, the gear control logic 265 may be implemented as hard block fixed circuitry. For example, an application specific integrated circuit (ASIC) may provide a gear control logic for timely changing the training of a receiver from a high learning mode to a low learning mode with customized hardware circuitry.

In some embodiments, some or all of the functions of the gear control logic 265a may be implemented in a processor (e.g., the controller 220) that is configured to execute a set of instructions stored in a data store to control the training of the receiver 230. The processor may be arranged on the same integrated circuit, which may be an FPGA (e.g., the FPGA 215) with the receiver 230. For example, the gear control logic 265 and the data store may be implemented in a programmable logic block of a system-on-chip (SOC) or implemented in a hard block using fixed circuitry of the SOC, and the receiver 230 may be implemented in another hard block using, for example, fixed circuitry of the SOC.

Figure 3A:
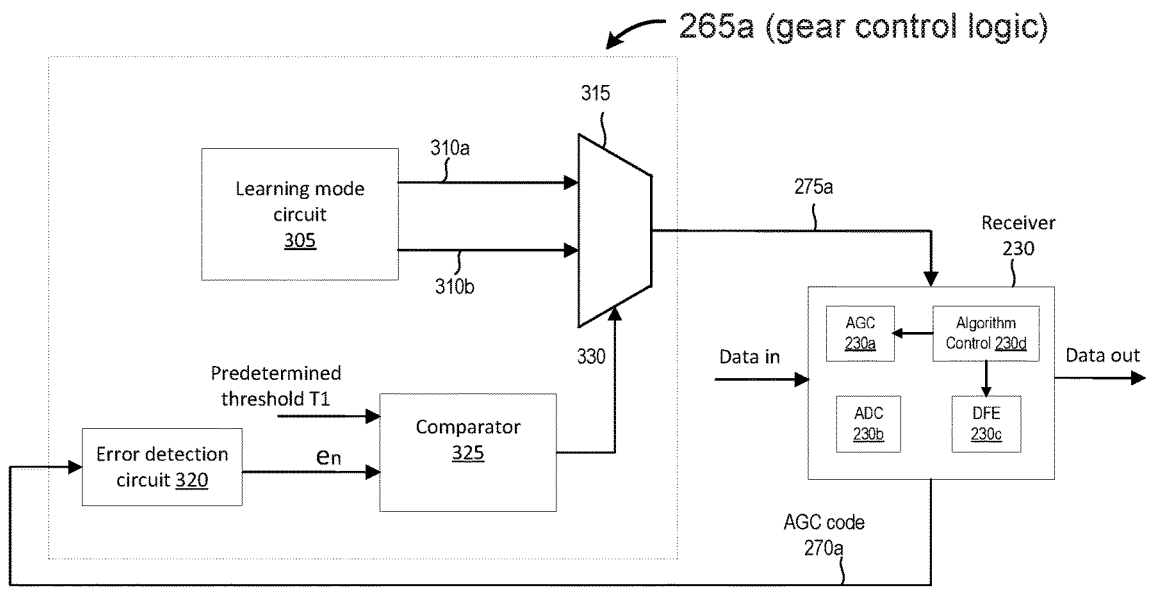
FIG. 3A depicts an exemplary gear control logic used to train a signal communication channel.

FIG. 3A depicts an exemplary gear control logic used to train a signal communication channel. A gear control logic 265a may be one embodiment of the gear control logic 265. The gear control logic 265a includes a learning mode circuit 305. The learning mode circuit 305 generates a high learning mode signal 310a that can train a receiver (e.g., the receiver 230) in a high learning rate. The learning mode circuit 305 also generates a low learning mode signal 310b that can train the receiver 230 in a low learning rate. The high learning mode signal 310a and the low learning mode signal 310b are received by a first selection circuit 315 (e.g., a first multiplexer). The first multiplexer 315 is controlled by a selection signal 330 to select between the high learning mode signal 310a and the low learning mode signal 310b.

The gear control logic 265a also includes an error detection circuit 320. The error detection circuit 320 receives a selected channel equalization parameter (e.g., AGC adaptation code) 270a from the receiver 230 and calculates a moving average difference $e_n$ in response to the received selected operation parameter of the receiver. An example of an error detection circuit is described in further detail with reference to FIG. 4.

The gear control logic 265a also includes a first comparator 325. The first comparator 325 receives a first user-defined error threshold $T_1$ and the moving average difference $e_n$ and compares the two received values. In response to the comparison, the first comparator 325 generates the corresponding selection signal 330 for the multiplexer 315. More specifically, when the moving average difference $e_n$ is larger than the user-defined error threshold $T_1$, which may mean the receiver has not been fully trained, the first comparator 325 may still instruct the multiplexer 315 to output the high learning mode signal 310a. When the moving average difference $e_n$ is smaller than or equal to the user-defined error threshold $T_1$, which may mean the receiver has been fully trained, the comparator 325 may select the multiplexer 315 to output the low learning mode signal 310b. The user-defined threshold $T_1$ may indicate a user-defined stability criteria of the receiver.

The selected learning mode signal 275a (e.g., the high learning mode signal 310a or the low learning mode signal 310b) is applied to the algorithm control circuit 230d of the receiver 230 and enables the receiver 230 to be trained in that mode.

Although the depicted figure presents an illustration hardware implementation using circuits, some or all of the functions of the gear control logic 265 may be implemented by a general processor (e.g., microcontroller) executing a program of instructions that perform the described operations.

Figure 3B:
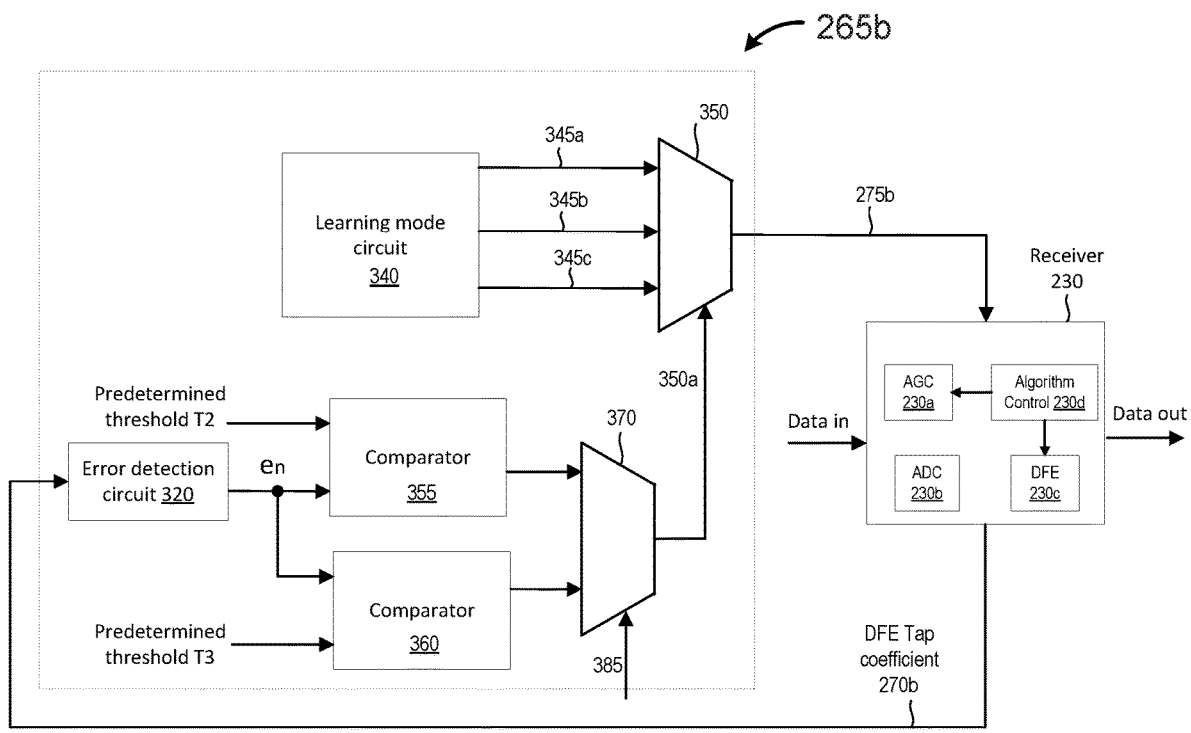
FIG. 3B depicts another exemplary gear control logic used to train a signal communication channel.

FIG. 3B depicts another exemplary gear control logic used to train a signal communication channel. A gear control logic 265b may be another embodiment of the gear control logic 265. The gear control logic 265b includes a learning mode circuit 340. The learning mode circuit 340 generates a high learning mode signal 345a that can train a receiver (e.g., the receiver 230) in a high learning rate. The learning mode circuit 340 also generates a medium learning mode signal 345b that can train a receiver (e.g., the receiver 230) in a medium learning rate. The learning mode circuit 305 also generates a low learning mode signal 345c that can train the receiver 230 in a low learning rate. The high learning mode signal 345a, the medium learning mode signal 345b, and the low learning mode signal 345c are received by a second selection circuit 350 (e.g., a second multiplexer). The second selection circuit 350 is controlled by a selection signal 350a to select among the high learning mode signal 345a, the medium learning mode signal 345b, and the low learning mode signal 345c. In some embodiments, the learning mode circuit 340 may be configured to generate more than three learning mode signals, for example, such as four, five or six learning mode signals with different adaptation rates.

The gear control logic 265b also includes the error detection circuit 320. The error detection circuit 320 receives a selected channel equalization parameter (e.g., DFE tap coefficient) 270b from the receiver 230 and calculates a moving average difference $e_n$ in response to the selected operation parameter of the receiver 230.

The gear control logic 265b also includes a second comparator 355. The second comparator 355 receives a second user-defined error threshold $T_2$ and the moving average difference $e_n$ and compares the two received values.

The gear control logic 265b also includes a third comparator 360. The third comparator 360 receives a third user-defined error threshold $T_3$ and the moving average difference $e_n$ and compares the two received values. The third user-defined error threshold $T_3$ may be smaller than the second user-defined error threshold $T_2$, for example.

The gear control logic 265b also includes a third selection circuit 370 (e.g., a third multiplexer) configured to receive the output of the second comparator 355 and the third comparator 360. The third selection circuit 370 is controlled by a selection signal 385 to select among the two received outputs of the second comparator 355 and the third comparator 360. The selection signal 385 may be programmed to instruct the third selection circuit 370 to generate the selection signal 350a. For example, when the error is larger than the second user-defined error threshold $T_2$, the third multiplexer may output the selection signal 350a as a positive value, for example. The positive selection signal 350a may instruct the second selection circuit 350 to generate the high learning mode signal 345a. When the error is smaller than the second user-defined error threshold $T_2$ and larger than the third user-defined error threshold $T_3$, the third multiplexer may output the selection signal 350a as zero, for example. The zero signal 350a may instruct the second selection circuit 350 to generate the medium learning mode signal 345b. When the error is smaller the third user-defined error threshold $T_3$, the third multiplexer may output the selection signal 350a as a negative value, for example. The negative selection signal 350a may instruct the second selection circuit 350 to generate the low learning mode signal 345c.

The selected learning mode signal 275b (e.g., the high learning mode signal 345a, the medium learning mode signal 345b, or the low learning mode signal 345c) is applied to the algorithm control circuit 230d of the receiver 230 and enables the receiver 230 to be trained in that mode. In some embodiments, the gear control logic 265a and/or the gear control logic 265b may be extended to use for a lock detection circuit, for example, a clock data recovery (CDR) lock detection circuit.

Figure 4:
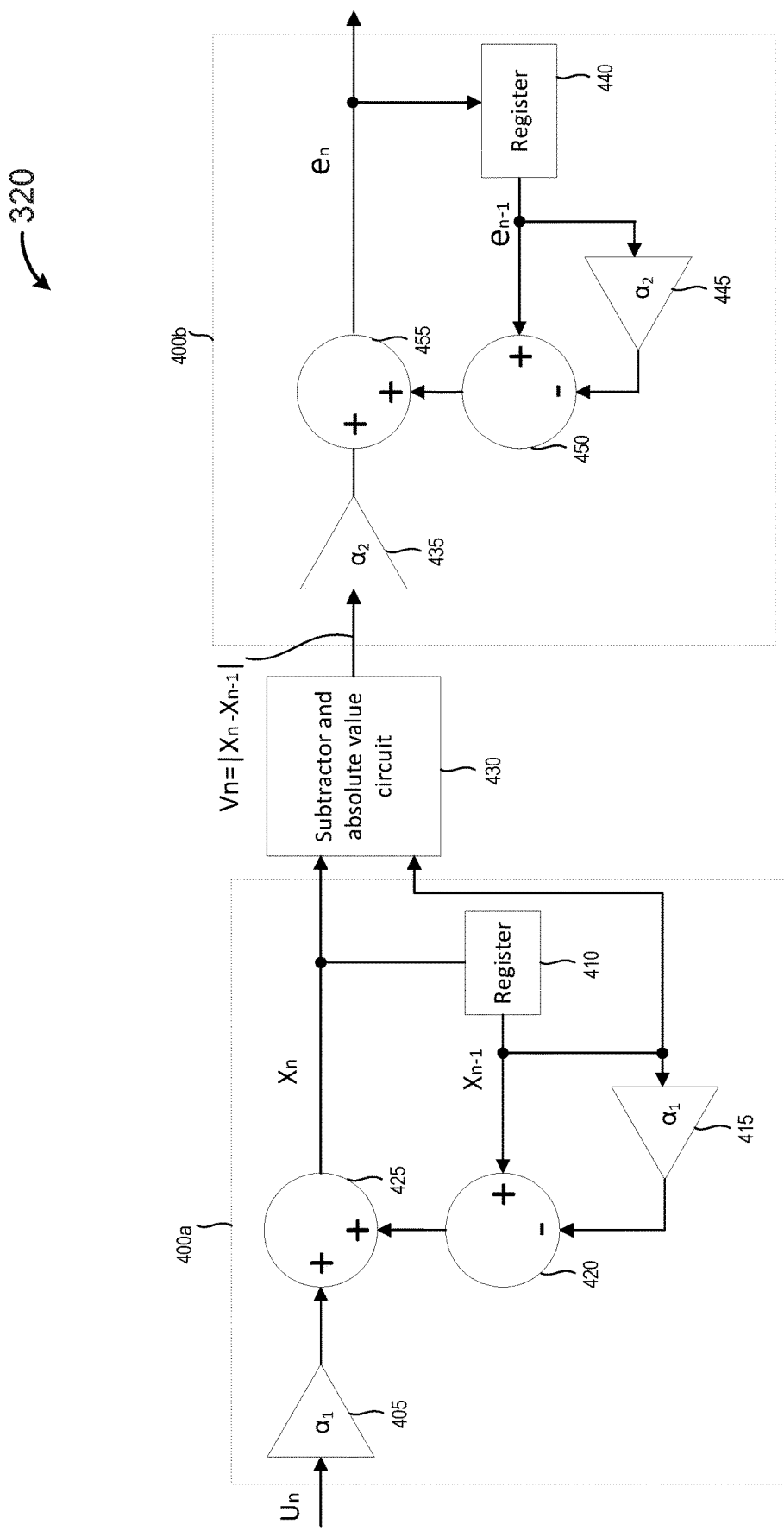
FIG. 4 depicts an exemplary error detection circuit implemented by the gear control logic.

FIG. 4 depicts an exemplary error detection circuit implemented by the gear control logic. The error detection circuit 320 includes a first exponentially weighted moving average (EWMA$_1$) circuit 400a. The EWMA$_1$ circuit 400a includes a first amplifier (405). The first amplifier 405 receives the operation parameter $u_n$ and amplifies the operation parameter $u_n$ with a first amplification coefficient at In various examples, the operation parameter $u_n$ may be, by way of example and not limitation, an AGC code 270a from the AGC circuit 230a and/or the DFE tap coefficient 270b of the DFE 230c.

The EWMA$_1$ circuit 400a also includes a first register 410. The first register 410 stores a former exponentially weighted moving average $x_{n-1}$. The EWMA$_1$ circuit 400a also includes a second amplifier 415. The second amplifier 415 receives the former exponentially weighted moving average $x_{n-1}$ and amplifies $x_{n-1}$ with the first amplification coefficient $\alpha_1$.

The EWMA$_1$ circuit 400a also includes a first subtraction circuit 420. The first subtraction circuit receives the $x_{n-1}$ and the $\alpha_1 x_{n-1}$ and generates a first temporary value $(1-\alpha_1)x_{n-1}$. The EWMA$_1$ circuit 400a also includes a first summing circuit 425. In some embodiments, the first summing circuit 425 may be a summing junction. The first summing circuit 425 connects with the first amplifier 405 and the first subtraction circuit 420 to generate the first exponentially weighted moving average $x_n$.

The EWMA$_1$ circuit 400a receives the operation parameter $u_n$ of a receiver (e.g., the receiver 230) and calculates a first exponentially weighted moving average $x_n$. In this depicted example, $x_n=(1-\alpha_1)x_{n-1}+\alpha_1 u_n$, $\alpha_1$ is a first decay rate. In some embodiments, the first decay rate may be the reciprocal of the size of a first moving average window length $W_1$. In some embodiments, the first moving average window length W1 may be predetermined by the user. For example, a first moving average window length may be 32 and $\alpha_1$ may be $1/32$. In some embodiments, the operation parameter may be an automatic gain control (AGC) adaptation code. In some embodiments, an Unroll Threshold (UT) code may be used as an operation parameter to be monitored as the basis for determining the learning rate. In some embodiments, if the two consecutive codes $x_n$ and $x_{n-1}$ are the same, the parameter may be stable. The gear control logic 265 may decide to configure the receiver (e.g., the receiver 230) to be trained with the low learning rate.

Any judgment based on a single occurrence of $x_n$ and $x_{n-1}$ may be misleading. To make the decision more reliable, in this depicted example, the gear switching control logic 265 also includes a calculation circuit 430 and a second exponentially weighted moving average (EWMA$_2$) circuit 400b. The calculation circuit 430 receives two consecutive exponentially weighted moving average $x_n$ and $x_{n-1}$ and outputs an intermediate value $v_n$, $v_n=|x_n-x_{n-1}|$.

The EWMA$_2$ circuit 400b includes a third amplifier 435. The third amplifier 435 receives the intermediate value $v_n$ and amplifies the intermediate value $v_n$ with a second amplification coefficient $\alpha_2$. The EWMA$_2$ circuit 400b includes a second register 440. The second register 440 stores a former moving average difference $e_{n-1}$.

The EWMA$_2$ circuit 400b also includes a second register 440. The second register 420 stores a former intermediate value $v_{n-1}$. The EWMA$_2$ circuit 400b also includes a fourth amplifier 445. The fourth amplifier 445 receives former moving average difference $e_{n-1}$ and amplifies $e_{n-1}$ with the second amplification coefficient $\alpha_2$.

The EWMA$_2$ circuit 400b also includes a second subtraction circuit 450. In some embodiments, the second subtraction circuit 450 may be a subtraction junction. The second subtraction circuit 450 receives the $e_{n-1}$ and the $\alpha_2 e_{n-1}$ and generates a second temporary value $(1-\alpha_2)e_{n-1}$. The EWMA$_2$ circuit 400b also includes a second summing circuit 455. In some embodiments, the second summing circuit 455 may be a summing junction. The second summing circuit 455 connects with the third amplifier 435 and the second subtraction circuit 450 to generate the moving average difference $e_n$.

The EWMA$_2$ circuit 400b receives the intermediate value $v_n$ and output a moving average difference $e_n$. In this depicted example, $e_n=(1-\alpha_2)e_{n-1}+\alpha_2 v_n$, $\alpha_2$ is a second decay rate. When the moving average difference $e_n$ is smaller than a user-defined error threshold (e.g., the user-defined error threshold $T_1$), the gear control logic 265 may switch the training from the high learning mode to the low learning mode. The exponentially weighted average is used to filter the toggling activities of the selected code. The moving average difference of two consecutive codes is used as the error to determine whether an adaptation loop is stable. In some embodiments, the second decay rate $\alpha_2$ may be the reciprocal of the size of a second moving average window length $W_2$. $\alpha_2$ may be different from $\alpha_1$. For example, a second moving average window length may be 16 and $\alpha_2$ may be $1/16$.

As there is no need to sample every adaptation code for each adaptation cycle since only the overall trend of the code changes is considered, in some embodiments, a down sampling clock that is several times slower than the clock that controls the adaptation clock may be used.

Figure 5A:
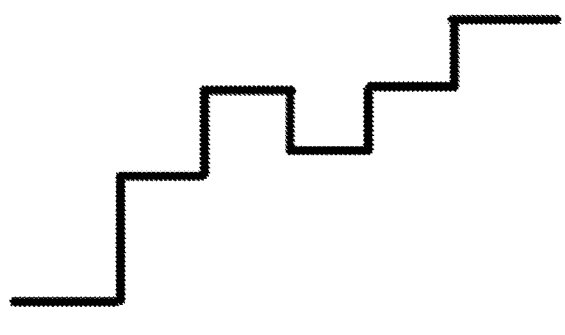
FIG. 5A depicts an exemplary toggling behavior of an operation parameter in the signal communication channel.

FIG. 5A depicts an exemplary toggling behavior of an operation parameter in the signal communication channel. In this depicted example, a (first or second) moving average window length is selected as six and the (first or second) decay rate is $1/8$. As shown in FIG. 5 A, the parameter is toggling and has an overall increasing trend.

Figure 5B:
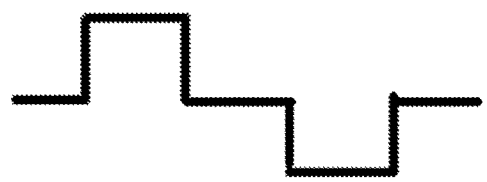
FIG. 5B depicts an exemplary toggling behavior of an operation parameter in the signal communication channel.

FIG. 5B depicts another exemplary toggling behavior of an operation parameter in the signal communication channel. In this depicted example, a (first or second) moving average window length is selected as five and the (first or second) decay rate is ⅛. As shown in FIG. 5B, the parameter toggles up and down, but there is no net change in the parameter. The codes are 0, +1, 0, −1, and 0 in the window length. The moving average is 0, which means there are no overall changes for this code. The table below exemplary shows the error calculated by the $EWMA_1$ and $EWMA_2$ of FIG. 5B.

| Initialize $X_o$= 0 | | | |
|---|---|---|---|
| $u_1 = 0$ | $X_1 = (1 − 1/8) x_0 + 1/8\ u_1 X_1 = 0$ | $V_1 = 0$ | $e_1 = 0$ |
| $u_2 = 1$ | $X_2 = (1 − 1/8) x_1 + 1/8\ u_2 X_2 = 1/8$ | $V_2 = 1/8$ | $e_2 = 1/64$ |
| $u_3 = 0$ | $X_3 = (1 − 1/8) x_2 + 1/8\ u_3 X_3 = 7/64$ | $V_3 = 1/64$ | $e_3 = 1/64$ |
| $u_4 = −1$ | $X_4 = (1 − 1/8) x_3 + 1/8\ u_4 X_4 = −15/512$ | $V_4 = 71/512$ | $e_4 = 127/4096$ |
| $u_5 = 0$ | $X_5 = (1 − 1/8) x_4 + 1/8\ u_5 X_5 = −105/4096$ | $V_5 = 15/2096$ | $e_5 = 113/4096$ |

Figure 6:
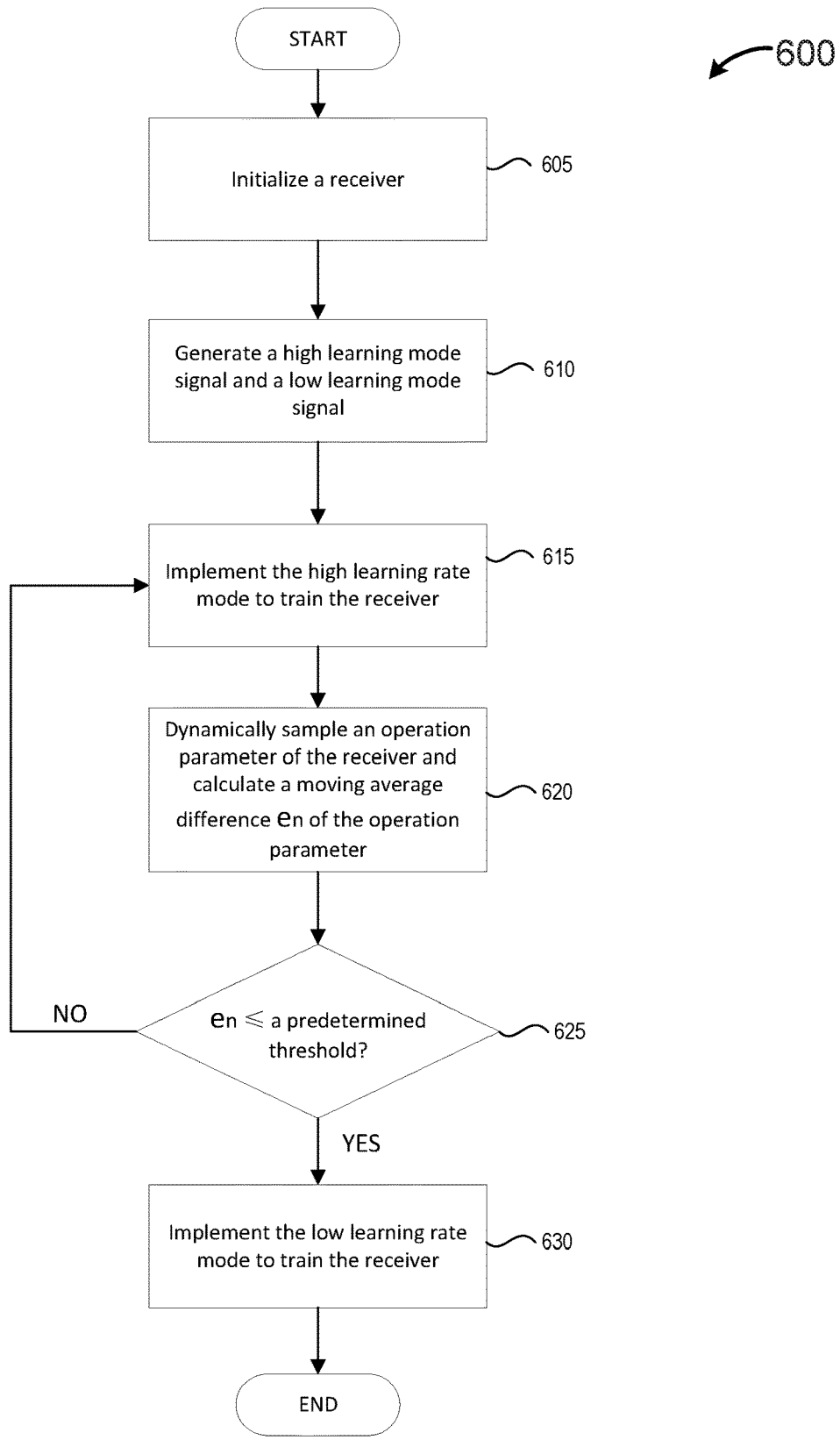
FIG. 6 depicts a flow chart of an exemplary method to control the training status of the signal communication channel.

FIG. 6 depicts a flow chart of an exemplary method to control the training status of the signal communication channel.

A method 600 illustrates an example to control the training status of a receiver. At 605, the gear control logic (e.g., the gear control logic 265) initialize a receiver (e.g., the receiver 230). At 610, the gear control logic 265 generates a high learning mode signal and a low learning mode signal. At 615, the gear control logic 265 enables the receiver 230 to implement training in a high learning rate mode.

At 620, the gear control logic 265 dynamically samples an operation parameter $u_n$ of the receiver and calculates a moving average difference $e_n$ of the operation parameter. The moving average difference $e_n$ may be calculated by the following algorithms:

$x_n = (1-\alpha_1)*x_{n-1} + \alpha_1*u_n$, $\alpha_1$ is a first decay rate;

$\theta_n = (1-\alpha_2)*e_{n-1} + \alpha_2*v_n$, $\alpha_2$ is a second decay rate;

$v_n = |x_{n-1}|$.

At 625, when if the moving average difference $e_n$ is not smaller than a predetermined error, then the gear control logic 265 instructs the receiver 230 to keep the high learning rate mode. If the moving average difference $e_n$ is smaller than a predetermined error, then at 630, the gear control logic 265 enables the receiver 230 to implement the training in a low learning rate mode.

Figure 7A:
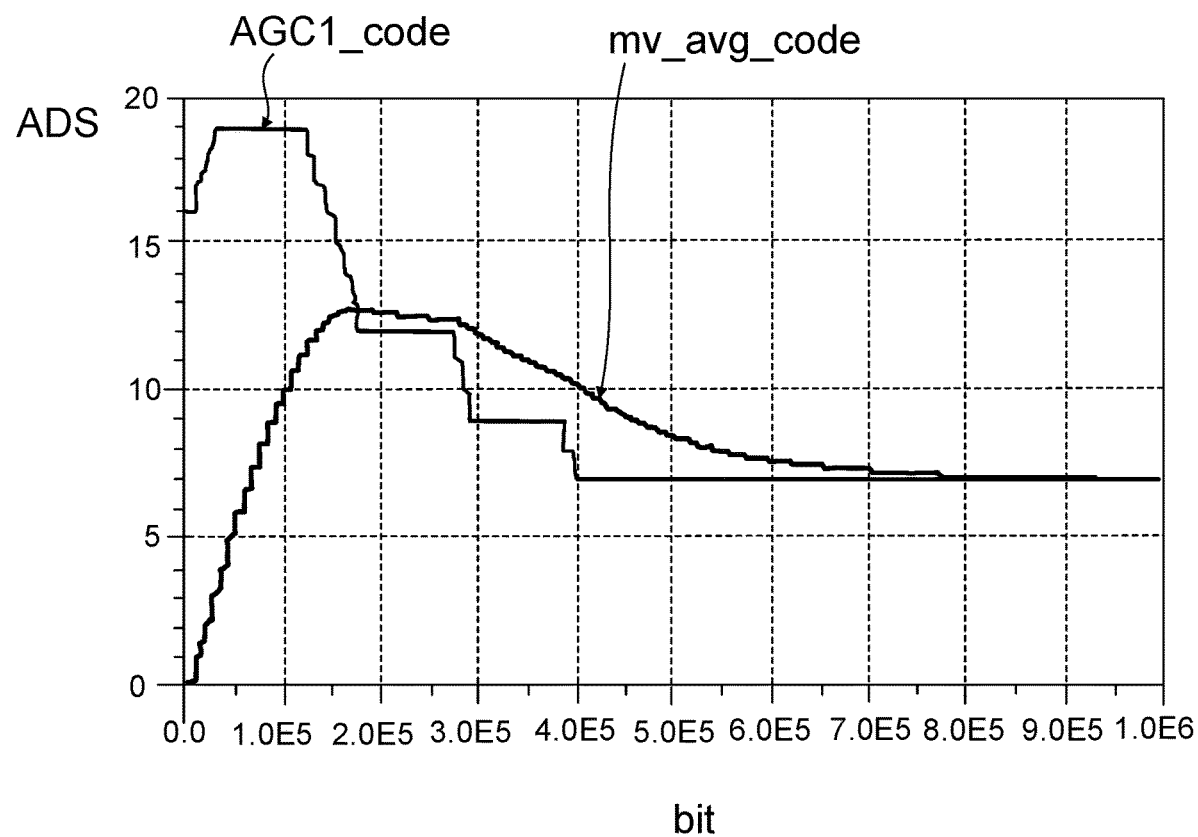
FIGS. 7A-7B depicts exemplary simulation results of the gear control logic.
Figure 7B:
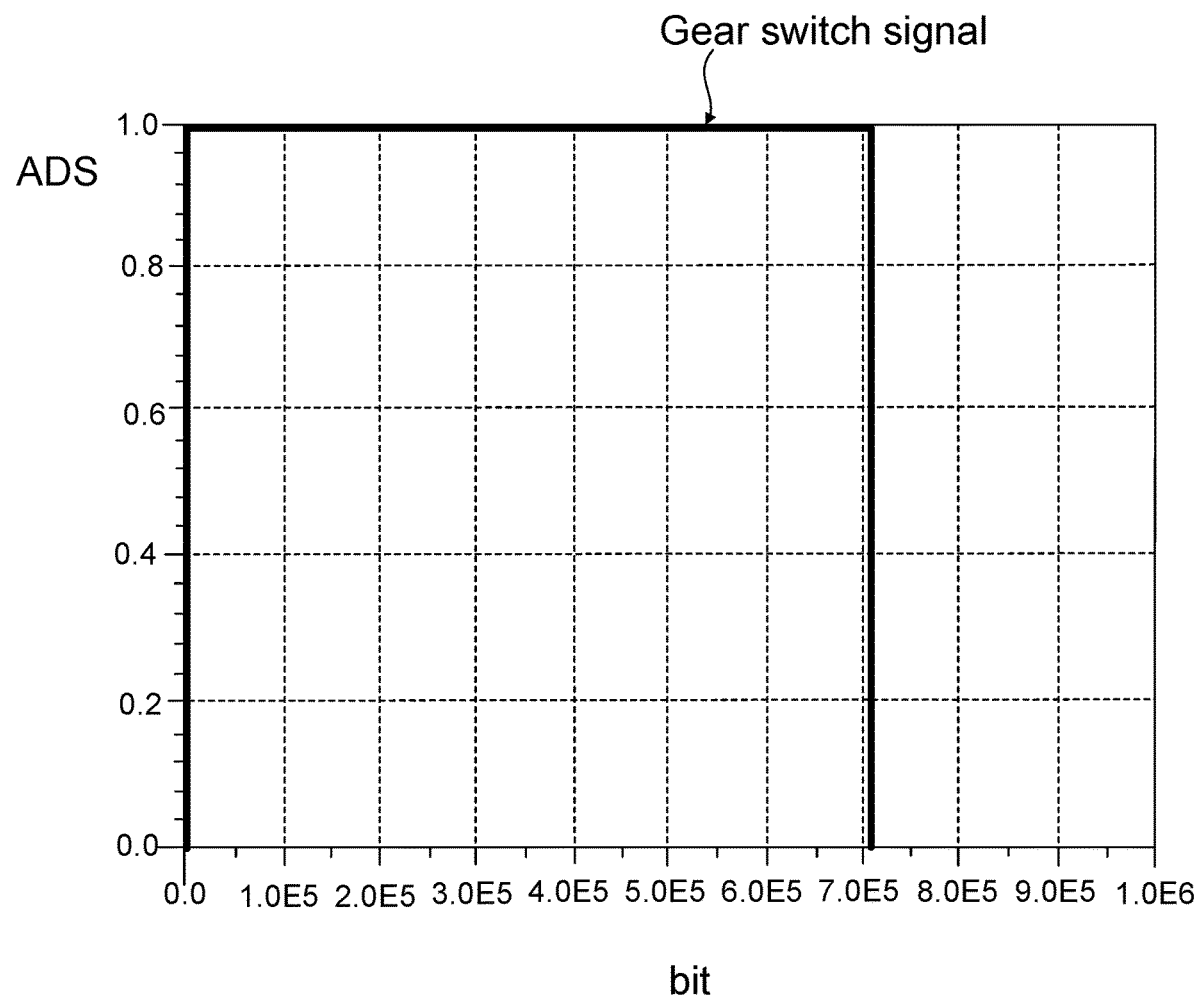

FIGS. 7A-7B depict exemplary simulation results of the gear control logic. In this depicted example, an automatic gain control (AGC) stage adaptation code is selected as an indicator of the training status of the receiver. In this simulation, the receiver operates at 56 Gb/s using a four-level pulse amplitude modulation (PAM4 signaling). The gear control logic uses a 25 dB channel. Both $\alpha_1$ and $\alpha_2$ are selected as 1/16. A down sampling rate N is selected as 128. The original code of the AGC is indicated as AGC1_code in FIG. 7A. The output of the EWMA is indicated as mv_avg_code (i.e., the Xn) in FIG. 7A. As shown in FIG. 7A, a high learning rate is applied and the AGC code changes quickly. The EWMA soon settles after the AGC code settles.

The output of the gear switching control logic is indicated as the agc_gear_control in FIG. 7B. The settled EWMA causes the gear control logic to switch the training from a high learning rate to a low learning rate. In this simulation, the EWMA settles at around 7.0E5 bit and the switching happens at around 7.0E5 bit. The settling rate of the EWMA may be determined by the decay rate $\alpha_1$ and $\alpha_2$ and the down sampling rate N. In some embodiments, the settling rate of the EWMA may also be determined by the user-defined error threshold.

Figure 7C:
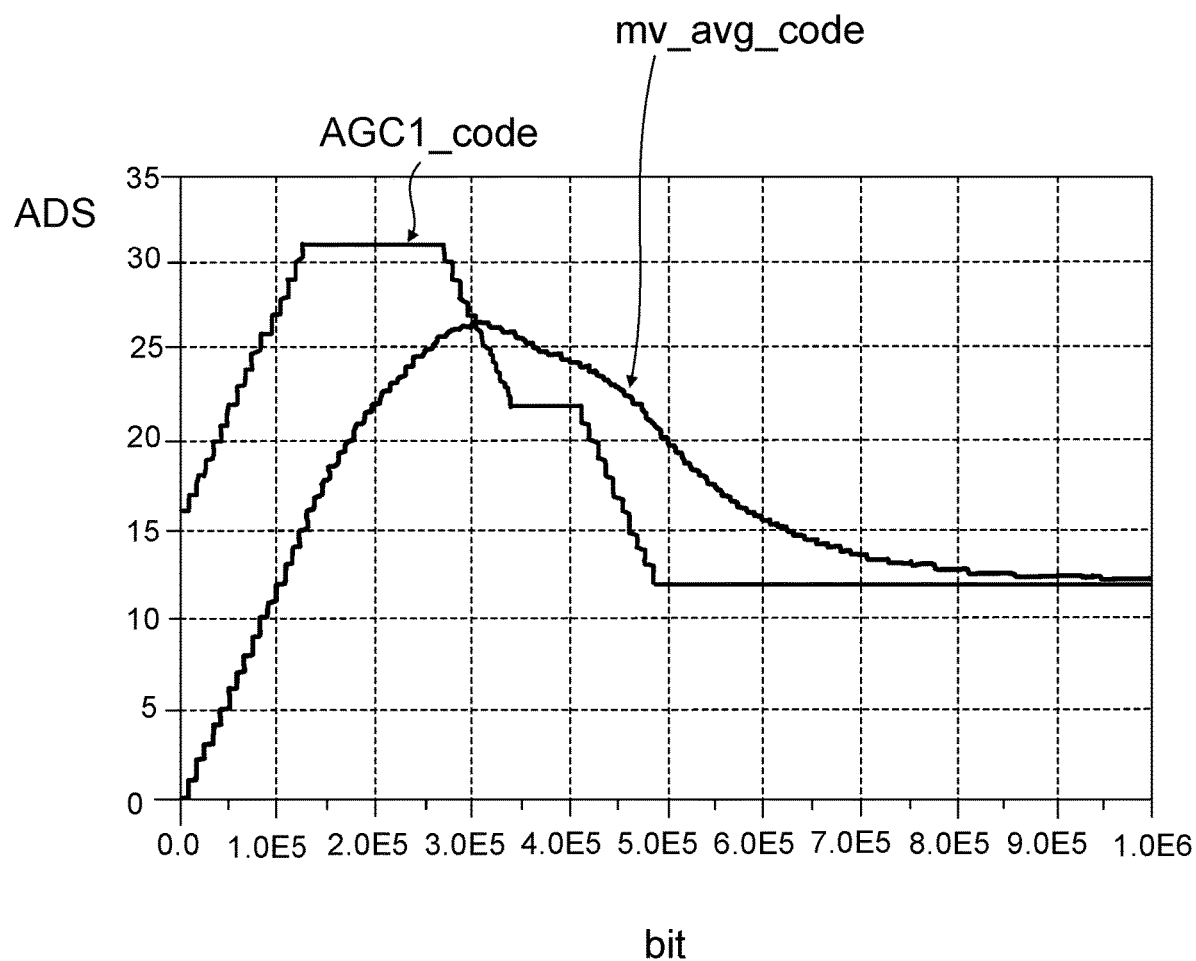
FIGS. 7C-D depicts another exemplary simulation results of the gear control logic.
Figure 7D:
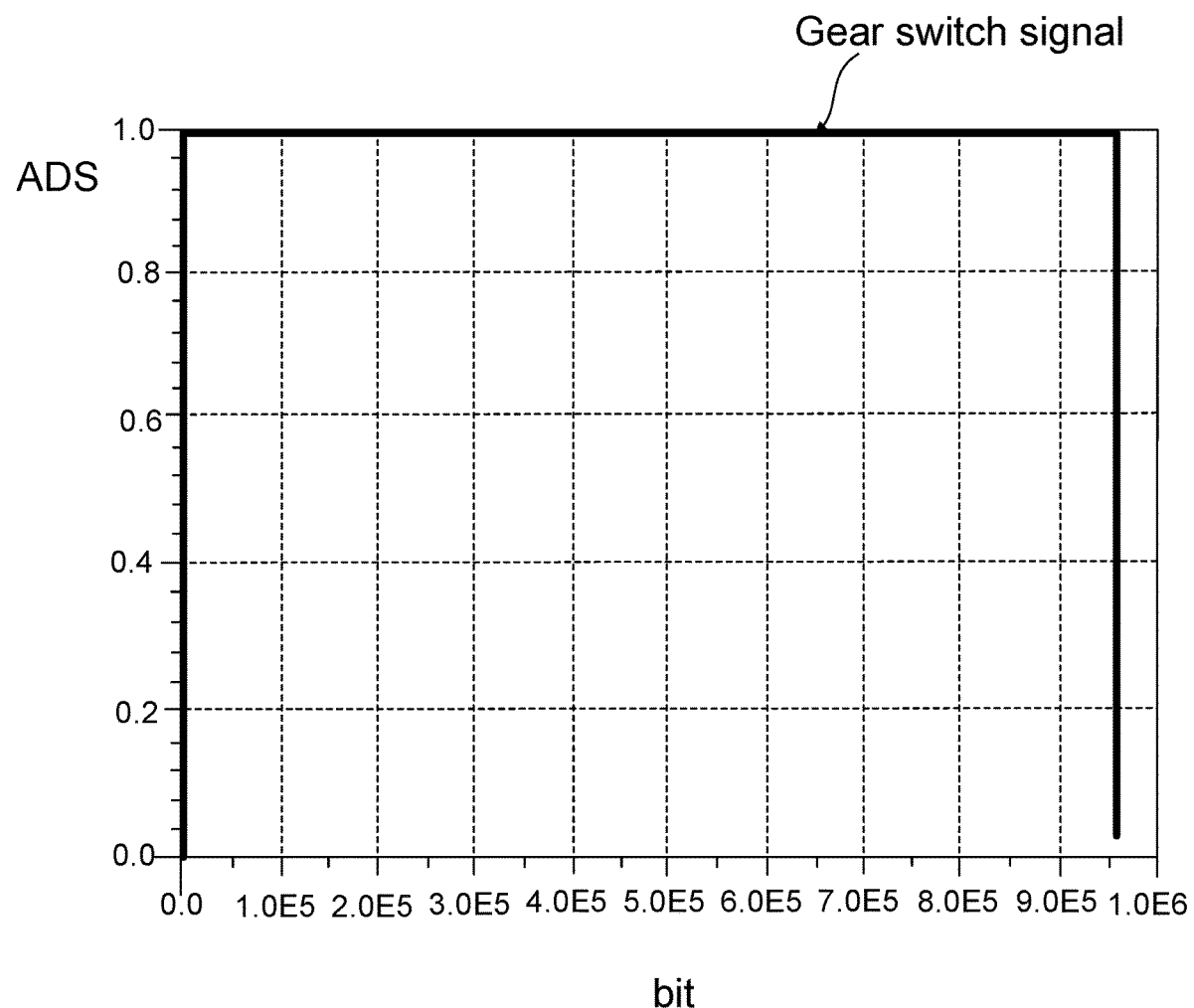

FIGS. 7C-7D depicts another exemplary simulation results of the gear control logic. In this depicted example, an automatic gain control (AGC) stage adaptation code is selected as an indicator of the training status of the receiver. In this simulation, the receiver operates at 56 Gb/s using a four-level pulse amplitude modulation (PAM4 signaling). The gear control logic uses a 32 dB channel. Both $\alpha_1$ and $\alpha_2$ are selected as 1/16. A down sampling rate N is selected as 128. The original code of the AGC is indicated as AGC1_code in FIG. 7C. The output of the EWMA is indicated as mv_avg_code in FIG. 7C. As shown in FIG. 7C, a high learning rate is applied and the AGC code changes quickly. The EWMA soon settles after the AGC code settles.

The output of the gear switching control logic is indicated as the agc_gear_control in FIG. 7D. The settled EWMA causes the gear control logic to switch the training from a high learning rate to a low learning rate. As the receiver takes a longer time to converge under the 32 dB channel, the gear switching happens later than using 25 dB channel. In this simulation, the EWMA settles at around 9.5E5 bit and the switching happens at around 9.5E5 bit. The settling rate of the EWMA may be determined by the decay rate $\alpha_1$ and $\alpha_2$ and the down sampling rate N. In some embodiments, the settling rate of the EWMA may also be determined by the user-defined error threshold.

Figure 8A:
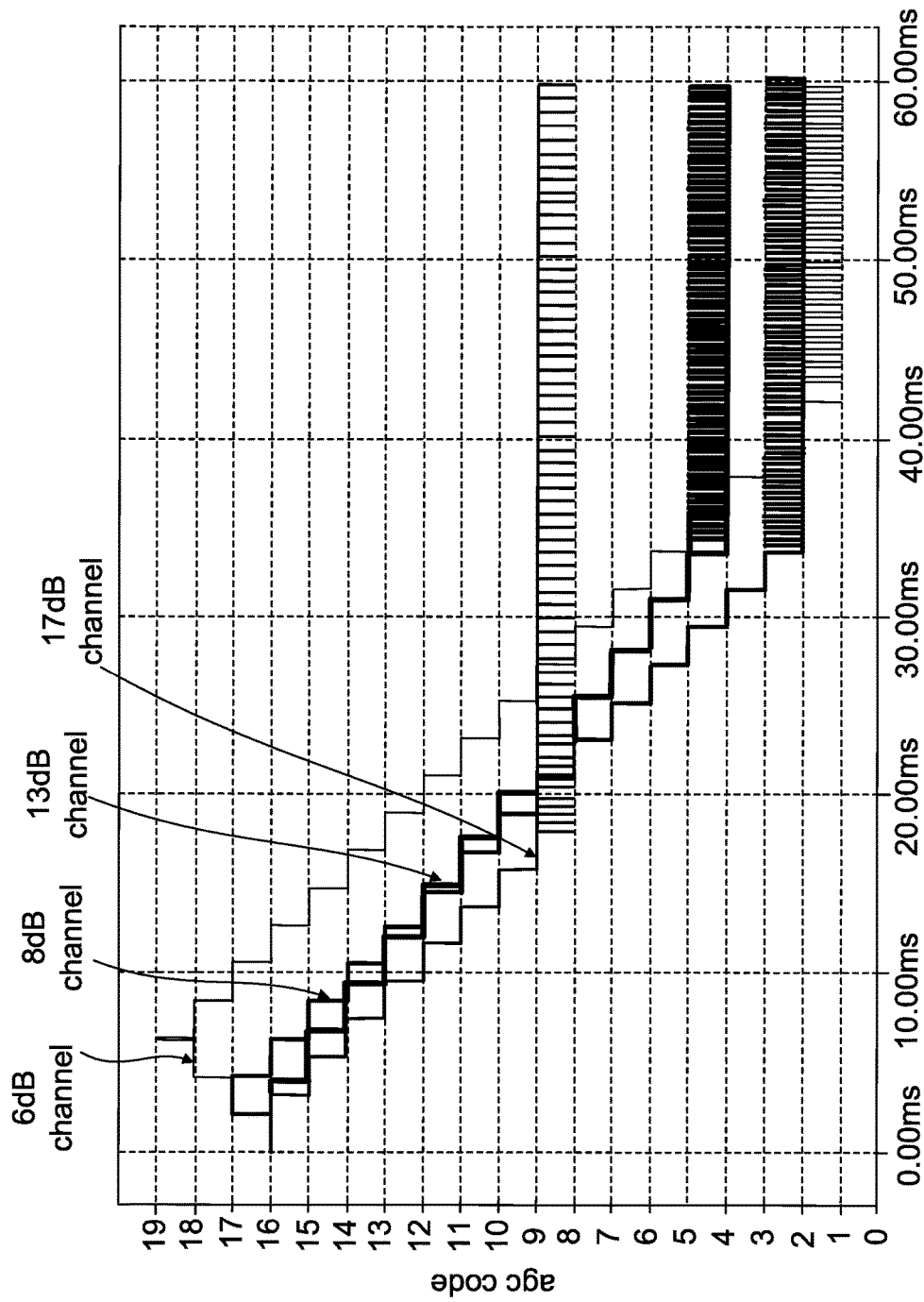
FIG. 8A depicts an exemplary lab test result of the gear control logic.

FIG. 8A depicts an exemplary lab test result of the gear control logic. In this depicted example, an automatic gain control (AGC) stage adaptation code is selected as an indicator of the training status of the receiver. In this depicted test, the receiver is trained by a low learning rate without using a gear control logic under different channels. For a 17 dB channel, the AGC code takes more than 15 ms before it converges. For a 13 dB channel, the AGC code takes more than 30 ms before it converges. For an 8 dB channel, the AGC code takes more than 30 ms before it converges. For a 6 dB channel, the AGC code takes more than 40 ms before it converges.

Figure 8B:
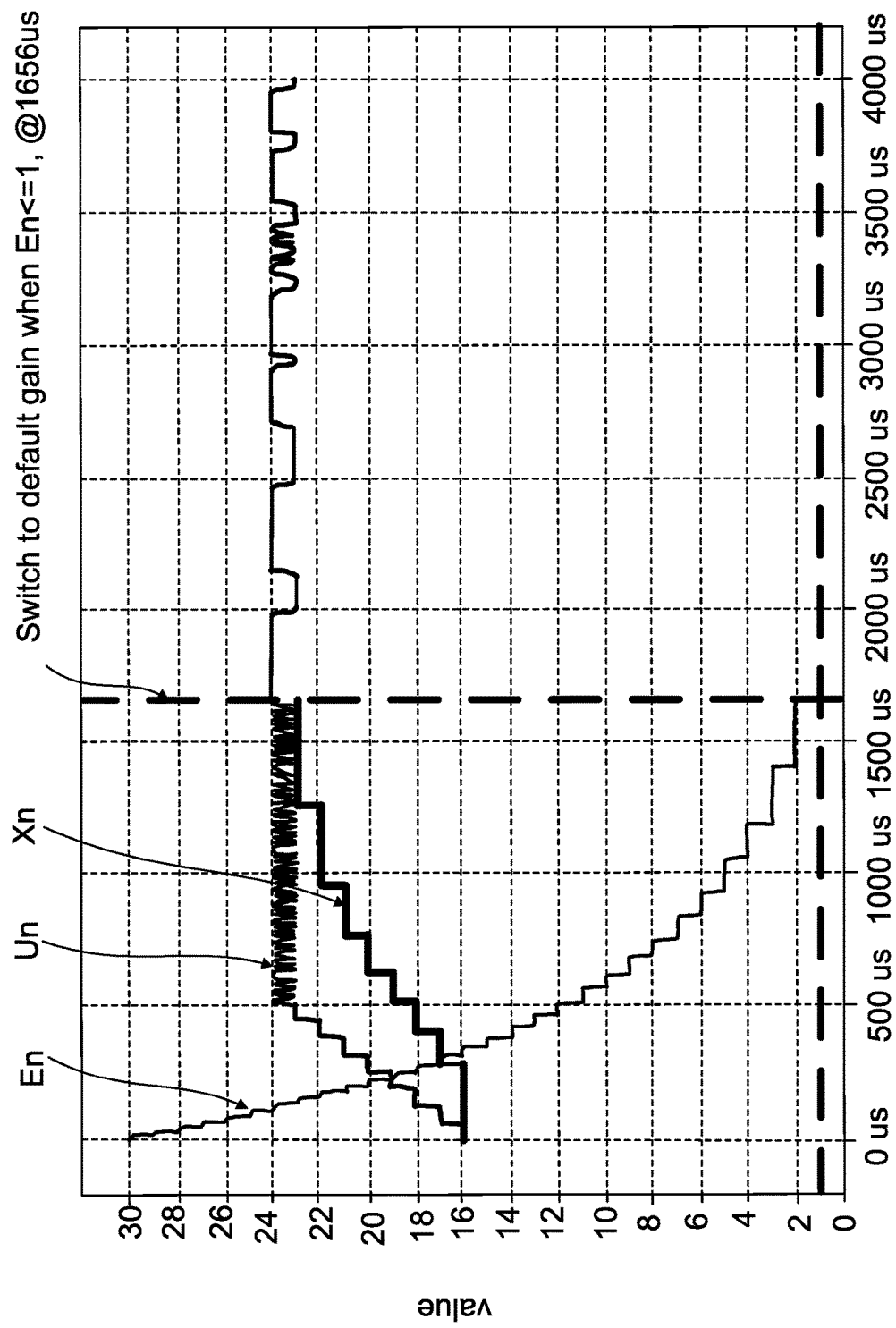
FIG. 8B depicts an exemplary lab test result of the gear control logic.

FIG. 8B depicts an exemplary lab test result of the gear control logic. In this depicted test, an automatic gain control (AGC) stage adaptation code is selected as an indicator of the training status of the receiver. In this depicted test, the receiver is trained by using a gear control logic under a 36 dB channel. In this lab experiment, when the predetermined error threshold is 1, the receiver takes 1656 $_\mu$s to make $e_n \leq 1$.

Figure 8C:
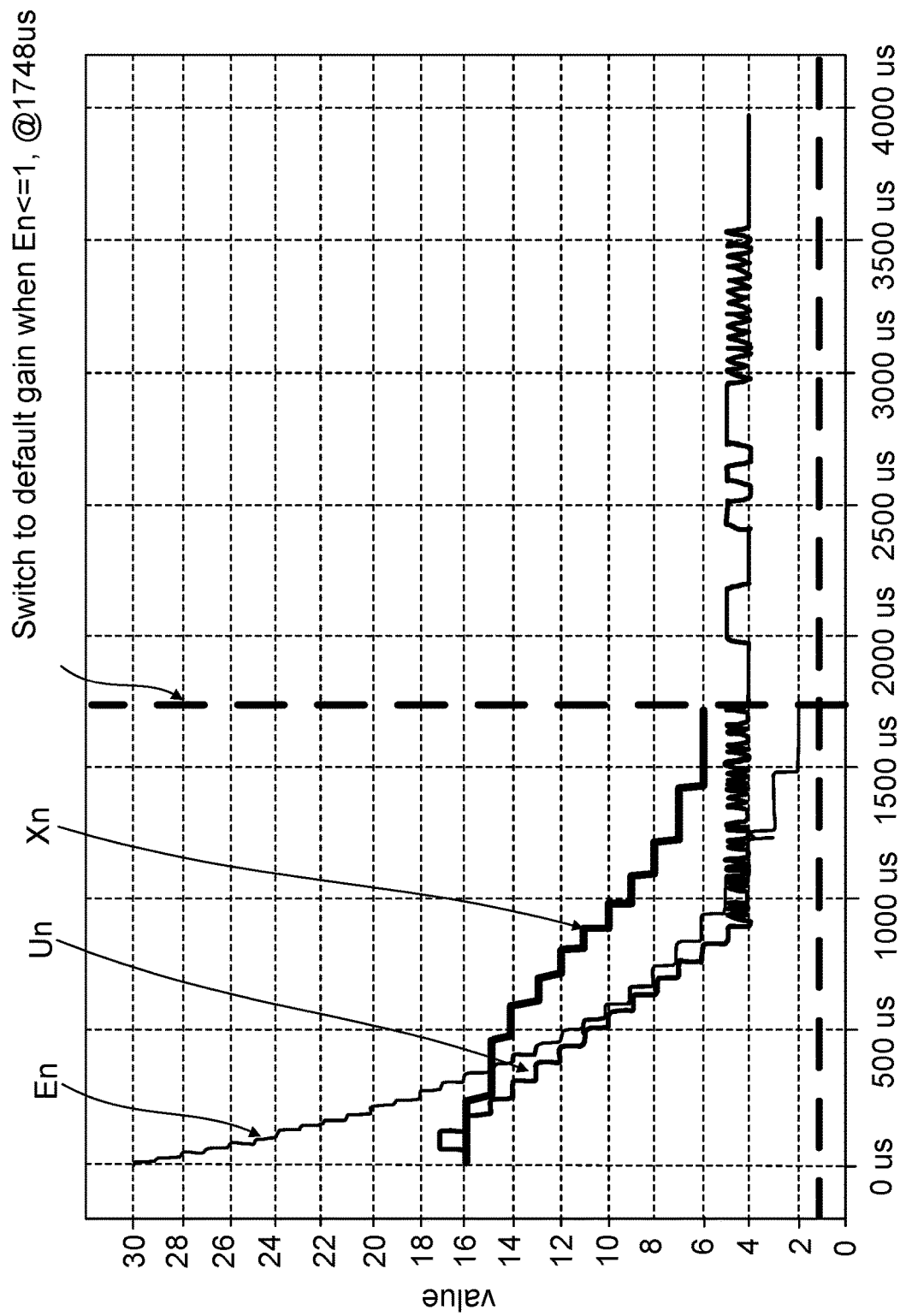
FIG. 8C depicts an exemplary lab test result of the gear control logic.

FIG. 8C depicts an exemplary lab test result of the gear control logic. In this depicted test, an automatic gain control (AGC) stage adaptation code is selected as an indicator of the training status of the receiver. In this depicted test, the receiver is trained by using a gear control logic under an 8 dB channel. In this lab experiment, when the predetermined error threshold is 1, the receiver takes 1748 $_\mu$s to make $e_n \leq 1$.

By using the gear control logic, the receiver can be trained with advantageously reduced time. The receiver may enter into a normal operation mode earlier.

Although various embodiments have been described with reference to the figures, other embodiments are possible. For example, the $EWMA_1$ algorithm may be extended as $x_n = (1-\alpha_1)*x_{n-1} + \alpha_2*u_n + \alpha_3*u_{n-1} + \alpha_4*u_{n-2}$. For example, the $EWMA_2$ algorithm may be extended as $e_n = (1-\alpha_5)*e_{n-1} + \alpha_6*v_n + \alpha_7*v_{n-1} + \alpha_8*v_{n-2}$. For example, the $EWMA_1$ algorithm may be extended as $x_n = (1-\alpha_1)*x_{n-1} + (1-\alpha_2)*x_{n-2} + (1-\alpha_3)*x_{n-3} + \alpha_4*u_n + \alpha_5*u_{n-1} + \alpha_6*u_{n-2}$. Those extensions may be used as the examples for higher-order moving average filter.

In some embodiments, a field programmable gate array (FPGA) may provide electrically reconfigurable, programmable hardware logic circuits formed in a fabric. The FPGA fabric may be reconfigurable, in response to electrical configuration signals, to provide a gear control logic. As taught herein, the reconfigured fabric may be arranged to produce a gear control logic for efficiently detecting the training status of a receiver.

Although various embodiments may be implemented using reconfigurable programmable logic blocks (e.g., FPGA), other embodiments may be implemented in fixed instantiations (e.g., ASIC). While dedicated hard block circuitry in an ASIC implementation may not be reconfigurable once instantiated in an integrated circuit, for example, an ASIC implementation may, in some implementations, provide for a minimized platform with respect to, for example, power consumption and/or die area. In some embodiments, an application specific integrated circuit (ASIC) may be manufactured to provide a fixed arrangement of hardware logic circuits (e.g., digital, analog). The ASIC may provide a gear control logic for timely changing the training of a receiver from a high learning mode to a low learning mode with customized hardware circuitry for one or more predetermined thresholds so that one or more ASICs, alone or in combination, can accelerate the receiver training.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a fixed hardware processor; and methods can be performed by a programmable processor executing a program of instructions to perform functions of various embodiments by operating on input data and generating an output. Some embodiments may be implemented advantageously in one or more computer programs that are executable on a programmable system including at least one processor coupled to receive data and instructions from, and to transmit data and instructions to, a data store, at least one input, and/or at least one output. A data store may include one or more registers or memory locations in, for example, a memory space. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other units suitable for use in a computing environment.

Suitable processors for the execution of a program of instructions include, by way of example and not limitation, both general and special purpose microprocessors, which may include a single processor or one of multiple processors. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, fixed hard blocks, such as ASICs (application-specific integrated circuits), or combined in a single integrated circuit (e.g., SOC) with programmable logic. In some embodiments, the processor and the memory can be supplemented by, or incorporated in hardware programmable logic devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples may be implemented using circuitry, including various electronic hardware. By way of example and not limitation, the hardware may include transistors, resistors, capacitors, switches, integrated circuits and/or other devices. In various examples, the circuits may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various systems may involve both hardware and software.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A control circuit, comprising:
    a learning mode circuit configured to generate a first learning mode signal $LM_1$ with a first adaptation rate and a second learning mode signal $LM_2$ with a second adaptation rate, the first adaptation rate is larger than the second adaptation rate; and,
    a selection circuit configured to receive the $LM_1$ and $LM_2$ and output a selected learning mode signal based on a comparison of a moving average difference $e_n$ to a predetermined stability criteria $T_1$ of a signal communication channel;
    wherein, the moving average difference $e_n$ comprises an exponentially weighted moving average of a difference between two consecutive exponentially weighted moving average of an operation parameter $u_n$ of the signal communication channel.

2. The control circuit of claim 1, wherein the selection circuit is further configured to switch from the first adaption rate to the second adaption rate in response to determining that the moving average difference $e_n$ satisfies the predetermined stability criteria $T_1$.

3. The control circuit of claim 1, wherein the operation parameter $u_n$ comprises an automatic gain control (AGC) adaptation code.

4. The control circuit of claim 1, wherein the signal communication channel comprises a SERDES receiver.

5. The control circuit of claim 1, wherein the signal communication channel comprises a clock data recovery lock detection circuit.

6. The control circuit of claim 1, wherein the first learning mode signal is configured to adapt the operation parameter $u_n$ according to a first clock rate and sample the operation parameter according to a second clock rate that is less than the first clock rate.

7. The control circuit of claim 1, further comprising an error detection circuit configured to detect the moving average difference $e_n$.

8. The control circuit of claim 7, wherein the error detection circuit comprises:
    a first exponentially weighted moving average ($EWMA_1$) circuit configured to receive the operation parameter $u_n$ and calculate a first exponentially weighted moving average $x_n$, $x_n=(1-\alpha_1)x_{n-1}+\alpha_1 u_n$;
    a calculation circuit configured to receive two consecutive first exponentially weighted moving average $x_n$ and $x_{n-1}$ and output an intermediate value $v_n$, $v_n=|x_n-x_{n-1}|$; and,
    a second exponentially weighted moving average ($EWMA_2$) circuit configured to receive the intermediate value $v_n$ and output the moving average difference $e_n$, $e_n=(1-\alpha_2)e_{n-1}+\alpha_2 v_n$, $\alpha_1$ is a first decay rate and $\alpha_2$ is a second decay rate.

9. The control circuit of claim 8, wherein the $EWMA_1$ circuit comprises:
    a first amplifier, having a first amplification coefficient $\alpha_1$, configured to receive the operation parameter $u_n$;
    a first register configured to store a former exponentially weighted moving average $x_{n-1}$;
    a second amplifier, having a first amplification coefficient $\alpha_1$, configured to receive the former exponentially weighted moving average $x_{n-1}$ and generate a first amplified former exponentially weighted moving average $\alpha_1 x_{n-1}$;
    a first subtraction circuit configured to receive the $x_{n-1}$ and the $\alpha_1 x_{n-1}$ and generate a first temporary value $(1-\alpha_1)x_{n-1}$; and,
    a first summing circuit configured to the first amplifier and the first subtraction circuit to generate the first exponentially weighted moving average $x_n$.

10. The control circuit of claim 9, wherein the $EWMA_2$ circuit comprises:
    a third amplifier, having a second amplification coefficient $\alpha_2$, configured to receive the intermediate value $v_n$;
    a second register configured to store a former moving average difference $e_{n-1}$;
    a fourth amplifier, having a second amplification coefficient $\alpha_2$, configured to receive the former moving average difference $e_{n-1}$ and generate a first amplified former moving average difference $\alpha_2 e_{n-1}$;
    a second subtraction circuit configured to receive the $e_{n-1}$ and the $\alpha_2 e_{n-1}$ and generate a second temporary value $(1-\alpha_2)e_{n-1}$; and,
    a second summing circuit configured to connect with the third amplifier and the second subtraction circuit to generate the moving average difference $e_n$.

11. A method to control the training of a signal communication channel, comprising:
    generating, by a learning mode circuit, a first learning mode signal $LM_1$ with a first adaptation rate and generating a second learning mode signal $LM_2$ with a second adaptation rate, the first adaptation rate is larger than the second adaptation rate;
    selecting, by a selection circuit, a learning mode signal from the $LM_1$ and the $LM_2$ based on a comparison of a moving average difference $e_n$ to a predetermined stability criteria $T_1$ of a signal communication channel; and,
    applying the selected learning mode signal on the signal communication channel;
    wherein, the moving average difference $e_n$ comprises an exponentially weighted moving average of a difference between two consecutive exponentially weighted moving average of an operation parameter $u_n$ of the signal communication channel.

12. The method of claim 11, wherein the selection circuit is further configured to switch from the first adaption rate to the second adaption rate in response to determining that the moving average difference $e_n$ satisfies the predetermined stability criteria $T_1$.

13. The method of claim 12, wherein:
when the moving average difference $e_n$ is larger than the predetermined stability criteria $T_1$, the selection circuit is configured to select the first learning mode signal $LM_1$;
when the moving average difference $e_n$ meets the predetermined stability criteria $T_1$, the selection circuit is configured to select the second learning mode signal $LM_2$.

14. The method of claim 11, wherein the signal communication channel comprises a SERDES receiver.

15. The method of claim 11, wherein the signal communication channel comprises a clock data recovery lock detection circuit.

16. The method of claim 13, wherein the operation parameter comprises an automatic gain control (AGC) adaptation code.

17. The method of claim 11, wherein the first learning mode signal is configured to adapt the operation parameter $u_n$ according to a first clock rate and sample the operation parameter $u_n$ according to a second clock rate that is less than the first clock rate.

18. The method of claim 11, wherein the moving average difference $e_n$ is detected by an error detection circuit, the error detection circuit comprises:
a first exponentially weighted moving average ($EWMA_1$) circuit configured to receive the operation parameter $u_n$ and calculate a first exponentially weighted moving average $x_n$, $x_n=(1-\alpha_1)x_{n-1}+\alpha_1 u_n$;
a calculation circuit configured to receive two consecutive first exponentially weighted moving average $x_n$ and $x_{n-1}$ and output an intermediate value $v_n$, $v_n=|x_n-x_{n-1}|$; and,
a second exponentially weighted moving average ($EWMA_2$) circuit configured to receive the intermediate value $v_n$ and output the moving average difference $e_n$, $e_n=(1-\alpha_2)e_{n-1}+\alpha_2 v$, $\alpha_1$ is a first decay rate and $\alpha_2$ is a second decay rate.

19. The method of claim 18, wherein the $EWMA_1$ circuit comprises:
a first amplifier, having a first amplification coefficient $\alpha_1$, configured to receive the operation parameter $u_n$;
a first register configured to store a former exponentially weighted moving average $x_{n-1}$;
a second amplifier, having a first amplification coefficient $\alpha_1$, configured to receive the former exponentially weighted moving average $x_{n-1}$ and generate a first amplified former exponentially weighted moving average $\alpha_1 x_{n-1}$;
a first subtracting circuit configured to receive the $x_{n-1}$ and the $\alpha_1 x_{n-1}$ and generate a first temporary value $(1-\alpha_1)x_{n-1}$; and,
a first summing circuit configured to the first amplifier and the first subtracting circuit to generate the first exponentially weighted moving average $x_n$.

20. The method of claim 19, wherein the $EWMA_2$ circuit comprises:
a third amplifier, having a second amplification coefficient $\alpha_2$, configured to receive the intermediate value $v_n$;
a second register configured to store a former moving average difference $e_{n-1}$;
a fourth amplifier, having a second amplification coefficient $\alpha_2$, configured to receive the former moving average difference $e_{n-1}$ and generate a first amplified former moving average difference $\alpha_2 e_{n-1}$;
a second subtraction circuit configured to receive the $e_{n-1}$ and the $\alpha_2 e_{n-1}$ and generate a second temporary value $(1-\alpha_2)e_{n-1}$; and,
a second summing circuit configured to connect with the third amplifier and the second subtraction circuit to generate the moving average difference $e_n$.

\* \* \* \* \*